(12) United States Patent
Zuccone

(10) Patent No.: US 9,751,034 B2
(45) Date of Patent: Sep. 5, 2017

(54) EMPTYING DEVICE

(71) Applicant: Parker Hannifin Manufacturing Switzerland SA, Carouge (CH)

(72) Inventor: Louis Zuccone, Onex (CH)

(73) Assignee: Parker Hannifin Manufacturing Switzerland SA, Carouge (CH)

( * ) Notice: Subject to any disclaimer, the term of this patent is extended or adjusted under 35 U.S.C. 154(b) by 340 days.

(21) Appl. No.: 14/368,021

(22) PCT Filed: Dec. 20, 2012

(86) PCT No.: PCT/IB2012/057529
§ 371 (c)(1),
(2) Date: Jun. 23, 2014

(87) PCT Pub. No.: WO2013/093835
PCT Pub. Date: Jun. 27, 2013

(65) Prior Publication Data
US 2014/0366961 A1 Dec. 18, 2014

(30) Foreign Application Priority Data
Dec. 23, 2011 (FR) ...................................... 11 62428

(51) Int. Cl.
*B01D 36/00* (2006.01)
*F16K 31/06* (2006.01)

(52) U.S. Cl.
CPC ......... *B01D 36/006* (2013.01); *B01D 36/005* (2013.01); *F16K 31/0655* (2013.01); *Y10T 137/7313* (2015.04)

(58) Field of Classification Search
CPC ................ B01D 36/006; B01D 36/005; B01D 31/0655; Y10T 137/7313
(Continued)

(56) References Cited

U.S. PATENT DOCUMENTS 3,004,670 A * 10/1961 Zonker ................ B01D 35/005
210/429
6,752,372 B1 * 6/2004 Maisch ..................... H01F 7/06
251/129.01
(Continued)

FOREIGN PATENT DOCUMENTS

DE 10-2009-052301 A 5/2011
EP 1 642 632 A 4/2006
EP 1 521 910 B 12/2008

OTHER PUBLICATIONS

Search Report and written opinion issued by French Patent Office for priority French application No. 1162428 dated Jun. 1, 2012.

*Primary Examiner* — Mary McManmon
*Assistant Examiner* — Daphne M Barry
(74) *Attorney, Agent, or Firm* — Haug Partners LLP

(57) ABSTRACT

The present invention relates to a draining device for discharging the water contained in a fuel filter manifold, including a draining solenoid valve comprising a valve body (1', 2') provided with a draining channel (17'), a coil winding (10'), a piston (8', 12') arranged such as to be movable between a passive position for closing the draining channel (17') and an active opening position allowing the water to be drained, the movement of the piston being controlled by the coil, characterized in that the valve body includes a first portion (1') that is integral with the manifold of said filter, the coil (10') and the electric circuit (3') being embedded by molding in said first portion (1') and a second portion (2') removably mounted on the lower end of the first portion (1') and provided with the draining channel (17').

9 Claims, 3 Drawing Sheets

(58) Field of Classification Search
USPC .............. 137/625.49, 625.48, 625.5, 630.15;
251/129.15, 129.01, 318, 324, 325;
210/295, 323.1, 416.4, 744, 800
See application file for complete search history.

(56) References Cited

U.S. PATENT DOCUMENTS

| | | | | |
|---|---|---|---|---|
| 7,368,060 | B2* | 5/2008 | Faxides | B01D 35/143 |
| | | | | 210/472 |
| 2006/0070956 | A1 | 4/2006 | Herrmann et al. | |
| 2006/0186031 | A1* | 8/2006 | Fick | B01D 29/118 |
| | | | | 210/235 |

* cited by examiner

EMPTYING DEVICE

This application is a 371 of PCT/IB2012/057529 filed on Dec. 20, 2012, published on Jun. 27, 2013 under publication number WO 2013/093835 A, which claims priority benefits from French Patent Application Number 1162428 filed Dec. 23, 2011, the disclosure of which is incorporated herein by reference.

The present invention relates to an emptying device designed to ensure the evacuation of water contained in a fuel filter collector, comprising an emptying solenoid valve including a valve body provided with an emptying channel, a coil winding, a piston arranged to be movable between a passive closed position of the emptying channel, and an active open position allowing the emptying of water, the movement of the piston being commanded by the coil.

It is known that fuels, and more specifically fuel for diesel engines, contain water. Before the fuel enters the engine, it passes through a filter and the water is separated from the fuel and collected in a collector situated below the filter. It is necessary to empty the water collector from time to time. Initially, the collector was emptied by pressing on a push-button and the collected water flowed by gravity. However, on the one hand, access to the collector is not always easy, and on the other hand, if one forgets to empty the filter, it risks becoming submerged in the collected water and losing its effectiveness.

In document EP 1,521,910, a solenoid valve is described that allows remote control of the emptying of the collector by gravity while ensuring an intake of air through specific orifices to facilitate and accelerate the evacuation of the collected water. In this device, the water flows toward the outside while crossing through the emptying channel located inside the coil of the solenoid valve and in which a piston rod moves to open or close the emptying channel. The solenoid valve in question is mounted below the collector after manufacturing thereof. This assembly of the solenoid valve and the placement of the electric connections and sealing gaskets after the manufacturing of the collector requires additional assembly and handling work of the different elements. Furthermore, the solenoid valve in question is rather cumbersome, and attention must be paid during mounting to ensure proper sealing, particularly given that the emptying channel is located inside the coil.

The present invention aims to propose an emptying device offsetting the aforementioned drawbacks.

The emptying device according to the invention is characterized in that the valve body comprises a first part integral with the collector of said filter, the coil and the electric circuit being embedded by molding in said first part and a second part mounted removably on the lower end of the first part and provided with the emptying channel, in that inside the coil, fixedly mounted is a first cylindrical body made from a magnetic material followed by the piston made up of a second cylindrical body made from a magnetic material axially spaced apart from the first by a spring, and in that said second magnetic body is provided with means making it possible to close the emptying channel in the passive position.

According to one embodiment, the means making it possible, in the passive position, for the solenoid valve to close the emptying channel are made up of a gland packing housed in said second magnetic body and pressing, in the passive position, against the inlet of the emptying-channel.

According to another embodiment, the second part of said valve body is provided with at least one air intake orifice and said piston is arranged to close the air intake orifice in the passive position, and to open it in the active position, allowing the emptying of water and the intake of air.

According to one preferred embodiment, said second magnetic body is secured in movement with a body comprising a first cylindrical passage ending in the passive position against the inlet of the emptying channel, said first cylindrical passage houses, in its lower part, a gland packing closing the emptying channel topped by a spring that presses by its other end against the lower end of the second magnetic body, on a radial projection of said first cylindrical passage, a second cylindrical passage is formed situated at the vertical of the air intake orifice, said second cylindrical passage is provided, on its lower end, with a gland packing closing the air intake orifice and it is topped by a spring whereof the other end abuts against the first part of the valve body.

According to another embodiment, the second part of the valve body is provided with at least two air intake holes.

Preferably, the device according to the invention is provided with a level sensor for the water in the collector comprising two electrodes connected by a resistance of approximately 1 MOhm situated in the upper part of the collector and close to the geometric axis of said upper part.

According to another embodiment, the upper part of the collector is cylindrical and comprises an annular part extending radially whereof the periphery has regular notches whereof the hollows are in the shape of a cylindrical sector, on either side of the annular part, two identical rings are mounted head to tail comprising clipping means forming, after clipping, a freely rotating ring provided on its periphery with a cylindrical sector open toward the outside with the same radius as the hollows of the notching, and comprising at least two inner radial lugs.

The invention will be described in more detail using the appended drawing.

Figure 1:
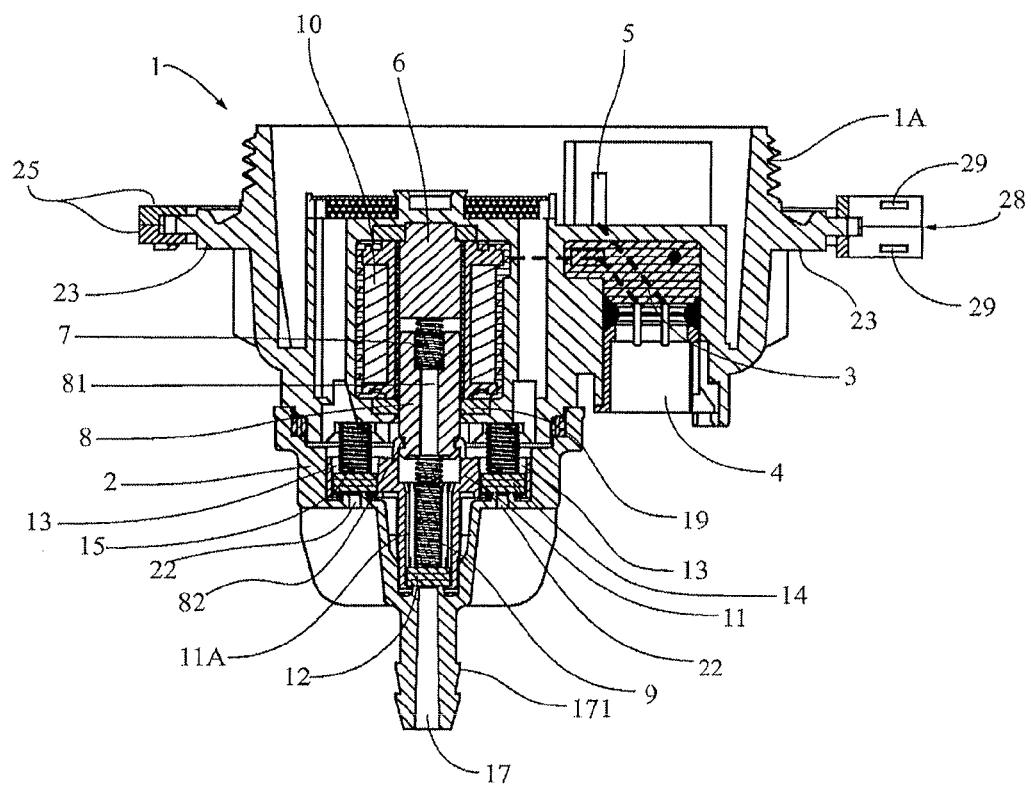
FIG. 1 is a vertical cross-section of one embodiment of the emptying device according to the present invention.
Figure 2:
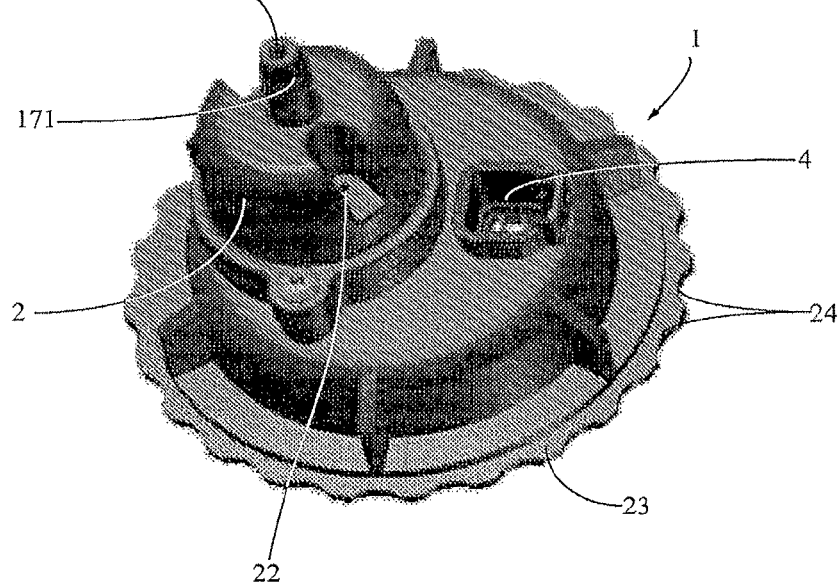
FIG. 2 is a perspective bottom view of the emptying device.
Figure 3:
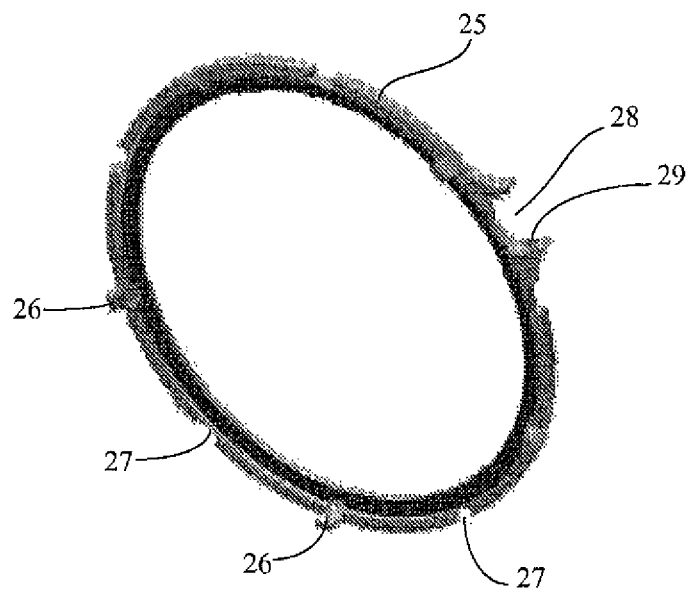
FIG. 3 is a perspective illustration of a ring.
Figure 5:
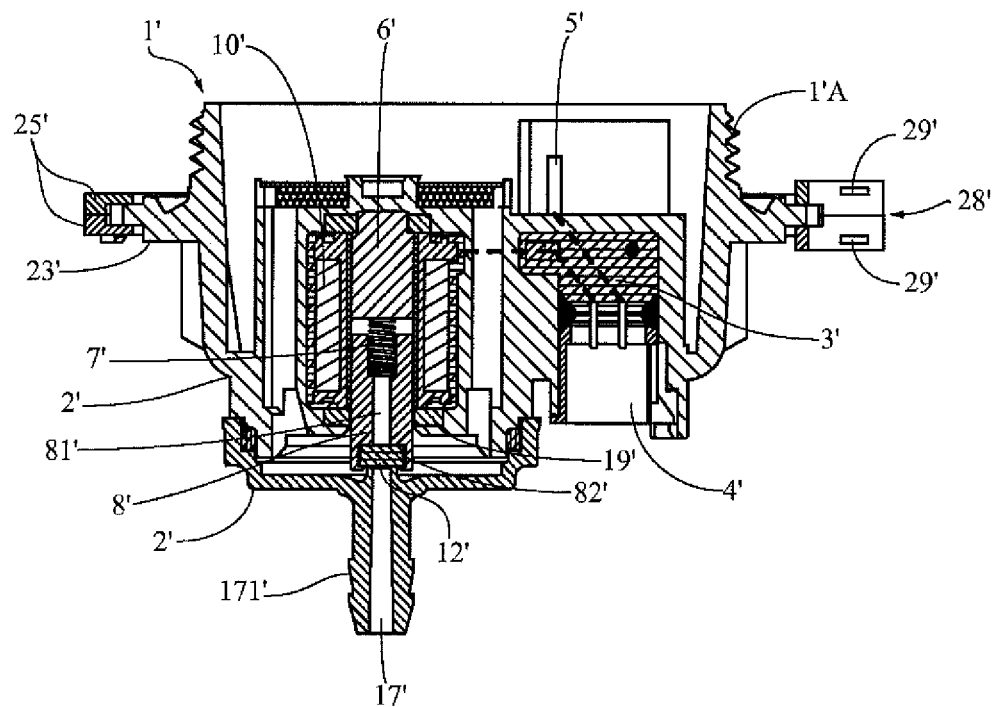
FIG. 5 is a vertical cross-section of a second embodiment of the emptying device according to the present invention.

The alternative embodiment illustrated in FIGS. 1 and 2 differs from that illustrated in FIG. 5 in that in the second one, there is no air intake orifice, which simplifies the valve body and makes it more compact.

The device of FIG. 1 comprises a first valve body 1 whereof the upper part forms a sort of cylindrical cup, which constitutes the water collector strictly speaking and which will be fastened to the lower part of the device housing the filter. In the present case, a thread 1A makes it possible to screw the first valve body 1 to the device housing the filter, but other means may be used. A cylindrical coil 10 and the electric connection and control circuit 3 are embedded by molding during manufacturing of the body 1. A level sensor comprising two electrodes 5 extends in the water collecting part, while the electric contacts for the power supply and control of the solenoid valve end in a connecting housing 4. The two electrodes 5 are connected by a resistance of approximately 1 MOhm. The purpose of this resistance is to be able to check that the level sensor is working from time to time by applying a voltage. Preferably, both electrodes 5 are situated as close as possible to the geometric axis of the cup, such that the detection of the water level is influenced little or not at all by any incline of the vehicle or machine provided with this emptying device. A second valve body 2 becomes fastened removably (screwing, catching, etc.) on the lower part of the first valve body 1. It comprises at least two orifices 22 for the air intake and the emptying channel 17. The outer part 171 of the emptying channel 17 is configured to couple a flexible hose thereto in order to discharge the collected water.

In the cylindrical passage of the coil 10, we have a first body 6 made from a magnetic material fastened in the valve body 1. It is followed by a second body 8 also made from a magnetic material, while a spring 7 partially housed in a cylindrical passage 81 of the second body 8 having a shoulder tends to separate the two bodies 6 and 8. The second body 8 is secured in movement with a hub 11 having a first central cylindrical passage 11A and at least two cylindrical passages 13 fastened on radial projections of the hub. The central cylindrical passage 11A is located at the vertical of the intake orifice of the emptying channel 17. Its lower part is provided with a gland packing 12 followed by a spring 9 pressing against the lower end of the second body 8 made from a magnetic material. The hub 11 is engaged in a groove 82 of the second body 8 by a narrowing of the upper end of the first cylindrical passage 11A. The gland packing 19 crossed through by the second body 8 closes the cylindrical passage of the coil 10. The second cylindrical passages 13 of the hub are positioned at the vertical of the air intake orifices 22. At their lower end, they contain gland packings 14 topped by springs 15 pressing by their second end against the first valve body 1.

In the passive position of the solenoid valve, the situation illustrated in the figure occurs. Under the pressure of the spring 7, the piston is in the lower position, while the spring 9 pushes the gland packing 12 against the orifice of the emptying channel 17 and hermetically closes it. Likewise, the springs 15 push the gland packing 14 against the air intake orifices 22 and close them hermetically.

When a predetermined water level in the collector is detected by the electrodes 5 either automatically or manually, the coil 10 is powered on. The second body 8 made from a magnetic material is attracted toward the first body 6 against the spring 7. By moving upward, the second body 8 drives the hub 11 against the springs 9 and 15, which makes it possible to open the orifice of the emptying channel 17, and the water flows by gravity. Simultaneously, the air intake orifices 22 also open, and air returns into the collector as the collected water level decreases, thereby facilitating emptying. When the water has flowed or after a certain amount of time, the power supply of the coil ceases and, under the pressure of the springs 7, 9, 15, one returns to the illustrated position.

There may be more than two air intake orifices 22.

The alternative embodiment of FIG. 5 comprises a first valve body 1', the upper part of which is identical to the upper part 1 of the alternative embodiment of FIG. 1. The 1', 1'A, 3', 4', 5', 10' correspond to elements 1, 1A, 3, 4, 5, 10 of the first valve body 1 of FIG. 1. A second valve body 2' becomes removably fastened (screwing, catching, etc.) on the lower part of the first valve body 1'. It comprises an emptying channel 17'. The outer part 171' of the emptying channel 17' is configured to couple a flexible hose thereto to discharge the collected water. The second valve body 2' being much smaller than the second valve body 2, we obtain a smaller device that is easier to manufacture because the entire part designed for the opening and closing of the orifices 22 is no longer necessary, and this embodiment is consequently less expensive.

In the cylindrical passage of the coil 10', we have the elements 6', 7', which are identical to the elements 6, 7. The second body 8' comprises a cylindrical passage 81' that ends with a widening 82' housing a gland packing 12'. The central cylindrical passage 81' is located at the vertical of the intake orifice of the emptying channel 17'. A gland packing 19' crossed through by the second body 8' closes the cylindrical passage of the coil 10'.

In the passive position of the solenoid valve, the situation illustrated in FIG. 5 occurs. Under the pressure of the spring 7', the piston is in the lower position under the action of the spring 7' and the gland packing 12' presses against the orifice of the emptying channel 17' and hermetically closes it.

When the electrodes 5' detect a predetermined water level in the collector, either automatically or manually, the coil 10' is powered on. The second body 8' made from a magnetic material is attracted toward the first body 6' against the spring 7'. By moving upward, the second body 8' moves the gland packing 12' away from the orifice of the channel 17', making it possible for the water to flow. When the water has flowed or after a certain amount of time, the power supply of the coil ceases and, under the pressure of the spring 7', there is a return to the illustrated position. There are two possibilities to compensate the lack of air intake orifices on the second body 2'. The first consists of applying pressure in the collector, for example using the fuel injection pump, which makes it possible to drive out the collected water when the emptying channel is opened. The second possibility is that in the body of the collector of the filter situated above the first valve body 1', two or three orifices are created that allow the intake of air. Of course, this solution is only suitable if the safety requirements allow it.

The advantages of these devices compared to the solenoid valve of document EP 1,521,910 are:

Decreased manufacturing cost, since it is no longer necessary to mount the solenoid valve on the water collector of the filter after it is manufactured and to proceed with the different electrical connections and the placement of sealing gaskets.

The solenoid valve itself is simpler and less cumbersome; it has no piston rod.

The solenoid valve requires less power to operate, since no part of the piston is subject to the pressure from the water.

A large part of the solenoid valve is not in contact with the water, since only the outer part of the lower end of the piston is in contact with the water.

Due to its construction, outside leaks are limited.

A sheath containing an electric cable providing the power supply and controlling the solenoid valves provided with a suitable connector plugged into the connection housing 4, 4' must be kept close to the valve body both during the initial installation and subsequent maintenance work. The aim is to prevent that sheath from accidentally catching or being mixed up with other cables or elements of the engine. There are of course such devices that can be fastened on the body of the solenoid valve permanently or removably. Nevertheless, when such a device is provided at a specific location of the valve body, its position after screwing of the body 1 on the upper body risks not being the desired position.

The inventor has sought an easy-to-implement solution making it possible to choose the holding position of the sheath freely.

Figure 4:
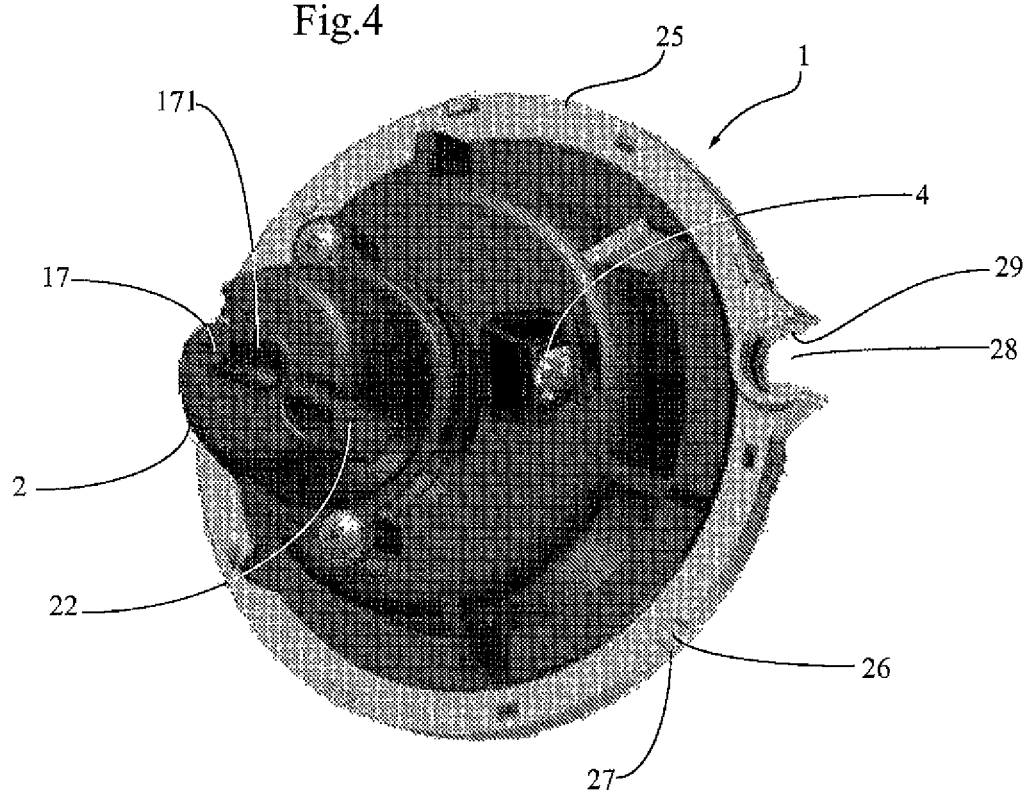
FIG. 4 is a perspective illustration of the device according to FIG. 2 provided with a holding ring for an electric cable sheath.

First, the upper part of the collector, which is cylindrical, has been provided with an annular part 23, 23' (FIG. 1, 2, 5) extending radially. The periphery of this annular part 23, 23' has a regular notching whereof the hollows 24 are in the shape of cylindrical sectors. Next, two identical rings 25, 25' (FIG. 1, 3, 5) are used, which are mounted head to tail on either side of the annular part 23, 23' (FIG. 4).

Each ring 25, 25' has several clipping lugs 26 regularly distributed and designed to collaborate with corresponding notches 27 of the other ring to keep them together, forming a freely rotating ring after the clipping. Each ring 25, 25' comprises, on its periphery, a cylindrical sector extending over a peripheral length slightly greater than a half-circumference with the same radius as the cylindrical sector 24 of the notching. Each cylindrical sector 28, 28' comprises two radial lugs 29, 29'. The dimensions of two rings 25, 25' allow the ring formed by the clipping of the rings 25, 25' on either side of the annular part 23, 23' to remain axially fixed, but freely rotating (FIG. 4). When the valve body is mounted on the upper body containing the filter, the ring made up of two rings 25, 25' is rotated until the cylindrical sector reaches the desired position, such that the cylindrical sector is found in a cylindrical sector 23, 23' of the notching. Next, the sheath is forced into the cylindrical sector 28, 28'. The sheath is flexible and its outer surface comprises annular grooves in which the lugs 29, 29' are housed. Thus, on the one hand, the sheath is held, and on the other hand, the rotation of the ring is locked.

The invention claimed is:

1. An emptying device designed to ensure the evacuation of water contained in a fuel filter collector, comprising an emptying solenoid valve including a valve body provided with an emptying channel, a coil winding, a piston arranged to be movable between a passive closed position of the emptying channel and an active open position allowing the emptying of water, the movement of the piston being commanded by the coil, wherein the valve body comprises a first part integral with the collector of said filter, the coil and an electric circuit being embedded by molding in said first part and a second part mounted removably on the lower end of the first part and provided with the emptying channel, wherein inside the coil, fixedly mounted, is a first cylindrical body made from a magnetic material followed by the piston made up of a second cylindrical body made from a magnetic material axially spaced apart from the first cylindrical body by a spring, and wherein said second magnetic body is provided with means making it possible to close the emptying channel in the passive position, wherein the second part of said valve body is provided with at least one air intake orifice, wherein said piston is arranged to close the air intake orifice in the passive position, and to open it in the active position, allowing the emptying of water and the intake of air.

2. The device according to claim 1, wherein the means making it possible, in the passive position, for the solenoid valve to close the emptying channel are made up of a gland packing housed in said second magnetic body and pressing, in the passive position, against the inlet of the emptying channel.

3. The device according to claim 2, wherein the emptying device is provided with a level sensor for the water in the collector comprising two electrodes connected by a resistance of approximately 1 MOhm situated in the upper part of the collector and close to the geometric axis of said upper part.

4. The device according to claim 1, wherein said second magnetic body is secured in movement with a body comprising a first cylindrical passage ending in the passive position against the inlet of the emptying channel, said first cylindrical passage houses, in its lower part, a gland packing closing the emptying channel topped by a spring that presses by its other end against the lower end of the second magnetic body, wherein on a radial projection of said first cylindrical passage, a second cylindrical passage is formed situated at the vertical of the air intake orifice, said second cylindrical passage is provided, on its lower end, with a gland packing closing the air intake orifice and it is topped by a spring whereof the other end abuts against the first part of the valve body.

5. The device according to claim 4, wherein the second part of the valve body is provided with at least two air intake holes.

6. The device according to claim 4, wherein the emptying device is provided with a level sensor for the water in the collector comprising two electrodes connected by a resistance of approximately 1 MOhm situated in the upper part of the collector and close to the geometric axis of said upper part.

7. The device according to claim 1, wherein the second part of the valve body is provided with at least two air intake holes.

8. The device according to claim 1, wherein the upper part of the collector is cylindrical and comprises an annular part extending radially whereof the periphery has a notch whereof the hollows are in the shape of a cylindrical sector, on either side of the annular part, two identical rings are mounted head to tail comprising clipping means forming, after clipping, a freely rotating ring provided on its periphery with a cylindrical sector open toward the outside with the same radius as the hollows of the notching, and comprising at least two inner radial lugs.

9. The device according to claim 1, wherein the upper part of the collector is cylindrical and comprises an annular part extending radially whereof the periphery has regular notches whereof the hollows are in the shape of a cylindrical sector, on either side of the annular part, two identical rings are mounted head to tail comprising clipping means forming, after clipping, a freely rotating ring provided on its periphery with a cylindrical sector open toward the outside with the same radius as the hollows of the notching, and comprising at least two inner radial lugs.

\* \* \* \* \*